US012692955B2

(12) United States Patent
Gilmore et al.

(10) Patent No.: US 12,692,955 B2
(45) Date of Patent: ***Jul. 28, 2026

(54) MAGNETICALLY COUPLED VALVE

(71) Applicant: Elemental Scientific, Inc., Omaha, NE (US)

(72) Inventors: Caleb Gilmore, Omaha, NE (US); Tyler Yost, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/903,396

(22) Filed: Oct. 1, 2024

(65) Prior Publication Data

US 2025/0129862 A1 Apr. 24, 2025

Related U.S. Application Data

(63) Continuation of application No. 17/949,538, filed on Sep. 21, 2022, now Pat. No. 12,104,710.

(60) Provisional application No. 63/248,098, filed on Sep. 24, 2021.

(51) Int. Cl.
F16K 31/04 (2006.01)
(52) U.S. Cl.
CPC .......... F16K 31/041 (2013.01); F16K 31/043 (2013.01)
(58) Field of Classification Search
CPC .............................. F16K 31/041; F16K 31/043
See application file for complete search history.

(56) References Cited

U.S. PATENT DOCUMENTS

| | | | |
|---|---|---|---|
| 2,708,944 A | 5/1955 | Modine | |
| 2,938,540 A | 5/1960 | Schatzman et al. | |
| 3,847,371 A | 11/1974 | Norton et al. | |
| 5,377,719 A | 1/1995 | Gyllinder et al. | |
| 7,201,185 B2 | 4/2007 | Poppe et al. | |
| 8,261,773 B2 | 9/2012 | Tower | |
| 10,526,931 B2 | 1/2020 | Goll et al. | |
| 10,666,124 B2 | 5/2020 | Barthel et al. | |
| 11,047,498 B2 | 6/2021 | Decker et al. | |
| 2004/0065856 A1 | 4/2004 | Chini et al. | |
| 2008/0191155 A1 | 8/2008 | Scollay | |
| 2016/0201827 A1 | 7/2016 | Tower | |
| 2019/0178411 A1 | 6/2019 | Ziegler et al. | |

(Continued)

FOREIGN PATENT DOCUMENTS

WO 2014128192 A1 8/2014

OTHER PUBLICATIONS

International Search Report and Written Opinion for PCT/US2022/044241, dated Jan. 18, 2023.
Rheodyne Injection Valve, pp. 1-3, 2016.

*Primary Examiner* — Umashankar Venkatesan
(74) *Attorney, Agent, or Firm* — Kevin E. West; Advent, LLP

(57) ABSTRACT

Valve assemblies are described that provide magnetic coupling between a valve actuator and a valve body housing the valve rotor and stator. A valve assembly embodiment, includes, but is not limited to, a valve body, the valve body including at least one magnet, and a rotor and a stator configured to define a plurality of fluid flow passageways; a valve actuator configured to drive the rotor via a drive shaft; and an actuator mount coupled to the valve actuator and configured to magnetically couple with the at least one magnet of the valve body to magnetically couple the valve body and the valve actuator.

18 Claims, 11 Drawing Sheets

(56)     References Cited

U.S. PATENT DOCUMENTS

| 2021/0116426 A1 | 4/2021 | Tiemeyer et al. |
| 2021/0293293 A1 | 9/2021 | Krause |
| 2021/0293343 A1 | 9/2021 | Chen et al. |
| 2021/0388909 A1 | 12/2021 | Keller et al. |

MAGNETICALLY COUPLED VALVE

BACKGROUND

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot, via one or more fluid pathways controlled by valve configurations, to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

Valve assemblies are described that provide magnetic coupling between a valve actuator and a valve body housing the valve rotor and stator. A valve assembly embodiment, includes, but is not limited to, a valve body, the valve body including at least one magnet, and a rotor and a stator configured to define a plurality of fluid flow passageways; a valve actuator configured to drive the rotor via a drive shaft; and an actuator mount coupled to the valve actuator and configured to magnetically couple with the at least one magnet of the valve body to magnetically couple the valve body and the valve actuator.

In an aspect, a valve assembly embodiment, includes, but is not limited to, a valve body configured to detachably couple to a valve actuator via magnetic interactions, the valve body including a rotor and a stator configured to define a plurality of fluid flow passageways through the valve assembly, a drive shaft extending through a shaft aperture formed in the valve body, the drive shaft configured to couple between the rotor and the valve actuator to drive the rotor, at least one magnet housed within an interior region defined by the valve body, the at least one magnet configured to magnetically couple with the valve actuator, and at least one of a protrusion configured to insert into an aperture on the valve actuator or an aperture configured to receive a protrusion on the valve actuator to prevent rotation of the valve body relative to the valve actuator when magnetically coupled.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

Figure 9A:
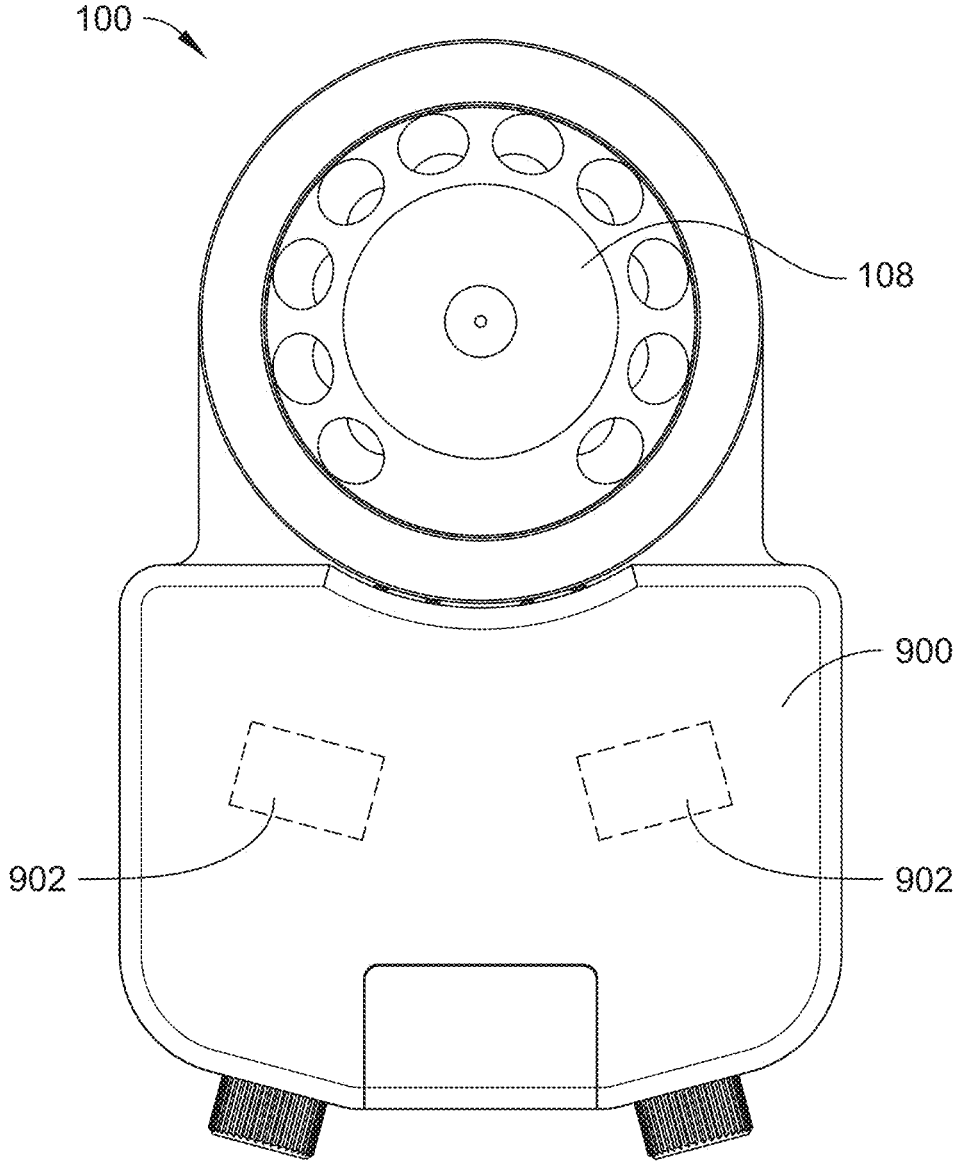
FIG. 9A is a front view of a valve assembly having a housing to support one or more fluid sensors and having magnetic coupling between a valve actuator and a valve body in accordance with embodiments of the present disclosure.
Figure 9B:
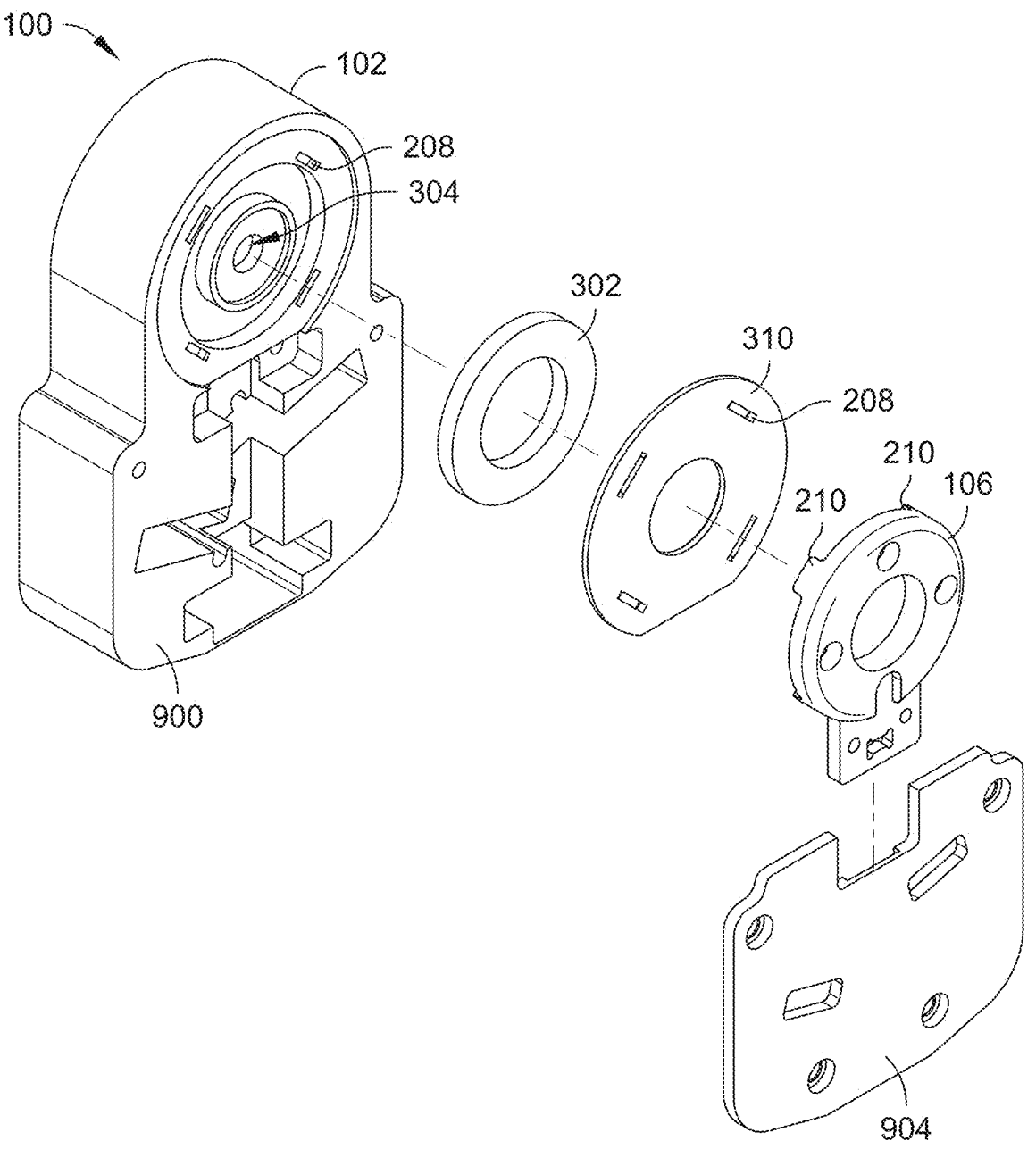

FIG. 9B is an exploded view of a rear of the valve assembly of FIG. 9A with the valve body having an annular region to house a magnet and having a valve body cover to seal the magnet within the valve body for magnetically coupling the valve body to a valve actuator mount having stability protrusions to interface with the slotted apertures of the valve body in accordance with embodiments of the present disclosure.

DETAILED DESCRIPTION

Overview

Multiport valves are used to transport and prepare fluid samples for analysis by laboratory equipment. For example, multiport valves can be used to introduce liquid samples into ICP spectrometry instrumentation for analysis through fluid connections via tubing coupled with ports of the valves. Multiport valves can also be used to load samples on columns for liquid and/or gas chromatography. Valves used in these applications can include six-port (6-port), two-position (2-position) rotary valves, although valves having fewer or greater numbers of ports and/or having more than two positions also can be used. Generally, two ports of a rotary valve are connected to an external (sample) loop or fluid holding line, one port is connected to a sample source, another port is connected to a carrier source, a further port is connected to a vent (waste), and another port is connected to a nebulizer/column. When the valve is in a first orientation, sample from the sample source flows into and through a sample loop, while carrier from the carrier source flows directly to a nebulizer/column. When the valve is rotated to a second orientation, the carrier source is connected to the sample loop for injecting the sample contained in the sample loop into the nebulizer or onto the column. In some multiport valve configurations, one fluid is mixed with another fluid by injecting the two fluids into separate ports or channels of a multiport valve. In these configurations, the two fluids meet to introduce the fluid flowing from one flow path to fluid flowing from another flow path to mix the fluid streams.

To facilitate the switching of valve orientations, valve assemblies can include a valve actuator having a motor or drive to rotate a valve rotor relative to a valve stator within the valve body. The rotor includes channels that selectably couple ports formed by the stator, where rotation of the rotor causes the channels to move between ports dependent on operation of the valve actuator. Since each of the valve actuator and the valve body house moving parts, such as the motor and the rotor, valve assemblies can include valve collars that hold the valve body stationary relative to the actuator. For example, the valve collar can include fasteners or fittings, such as bolts, that physically bias the collar against structures present on the valve body and the actuator (e.g., via friction fit), which can prevent rotation of the valve body with respect to the actuator when the actuator rotates the rotor within the valve body.

Such valve configurations reliant on the valve collar can provide drawbacks for many laboratory operations. For example, the fasteners or fittings on the valve collar can become loosened during usage of the valve, which can reduce the force the collar applies against the valve body and the actuator. As the valve collar loosens, portions of the valve body can rotate and cause the valve to no longer be calibrated or otherwise provide a risk for faulty valve operation or positioning. Further, the fasteners or fittings can loosen based on environmental or valve system temperature fluctuations, such as by loosening in response to frequent changes between hot and cold temperatures in the laboratory environment or based on the temperature of fluids flowing through the valve. As another example, the valve collars can add bulk to the valve by extending the valve body out from the actuator, requiring more physical space around laboratory equipment for installing and maintaining the valve assembly. As another example, the valve collars can require additional tools and hardware for installation, which can complicate the installation process or introduce risks for improper alignment of the valve body during installation.

Accordingly, the present disclosure is directed, at least in part, to valve assemblies that provide magnetic coupling between a valve actuator and a valve body housing the valve rotor and stator. The valve assemblies house one or more magnets within the valve body to magnetically couple with an actuator mount secured to the valve actuator without use of a valve collar. The valve body and the actuator mount include one or more mating features to prevent rotation of the valve body relative to the valve actuator. In an aspect, the valve body includes one or more slotted apertures to receive stability protrusions from the actuator mount secured to the valve actuator to provide resistance to rotational movement of the valve body relative to the valve actuator. In an aspect, the one or more magnets within the valve body are displaced radially outward from an axis of rotation of a drive shaft coupled between the valve rotor and a motor of the valve actuator. The one or more magnets provide a magnetic coupling through the valve body to the actuator via the actuator mount. In an aspect, the magnetic coupling between the valve body and the valve actuator provides sufficient force to stably couple the valve body and the valve actuator without use of a valve collar, providing a more compact size for the valve assembly without risk of a loosened coupling between the valve body and the valve actuator (e.g., due to loosened fasteners, temperature fluctuations, etc.). Moreover, the valve body can be removed without hardware or tools to loosen valve collar couplings, providing convenient methods to replumb fluid lines introduced to the stator or swap in a different valve body (e.g., having different fluid connections, different fluid flow requirements, etc.).

Example Implementations

Figure 1:
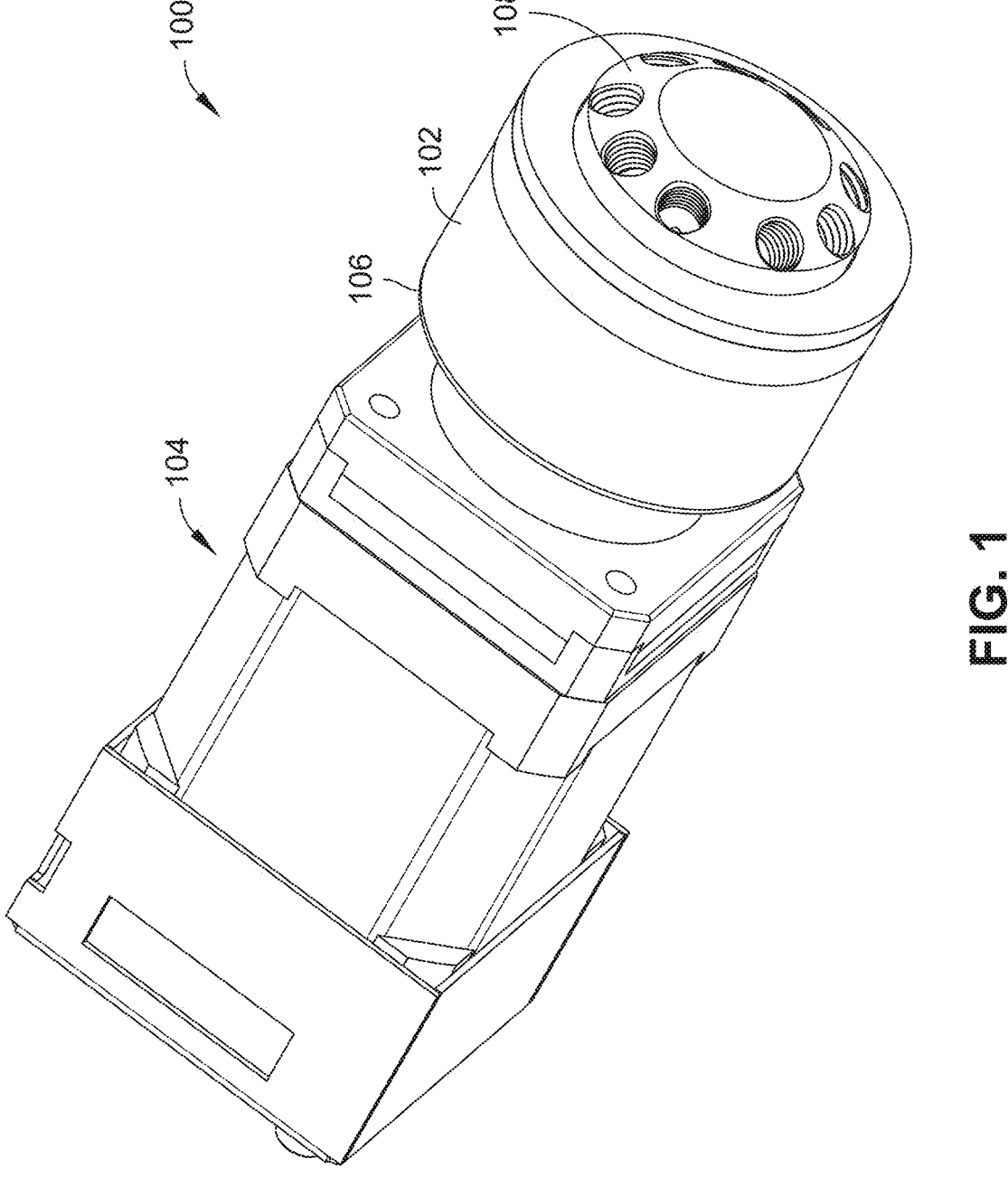
FIG. 1 is an isometric view of a valve assembly having magnetic coupling between a valve actuator and a valve body in accordance with embodiments of the present disclosure.

FIGS. 1-9B illustrate aspects of a valve assembly providing magnetic coupling between a valve body and portions of a valve actuator configured to drive operation of the valve body ("valve 100"). The valve 100 generally includes a valve body 102, a valve actuator 104, and an actuator mount 106 coupled between the valve body 102 and the valve actuator 104. The valve body 102 houses a rotor and a stator to form fluid flow pathways through which fluids can pass into the valve via one or more ports and are directed out from the valve through other ports based on the valve configuration formed by channels in the rotor and ports of the stator. The fluid flow pathways are configured to pass fluids that include, but are not limited to, liquids, gases, vapors, fluids containing dissolved solids, fluids carrying entrained liquids, solids, or gases, and combinations thereof. For example, FIG. 1 shows nine ports on a valve face 108 to couple with nine fluid lines, however the valve 100 is not limited to nine ports and can include greater than nine ports or fewer than nine ports. Moreover, the valve 100 is not limited to ports having removably coupled fluid lines and can include fluid lines permanently coupled to one or more stator ports. The valve actuator 104 generally includes a motor or drive to rotate the valve rotor relative to the valve stator within the valve body 102 when the valve body 102 is coupled to the valve actuator 104 via magnetic coupling between the valve body 102 and the actuator mount 106, described further herein. The rotor includes channels that

Figure 2:
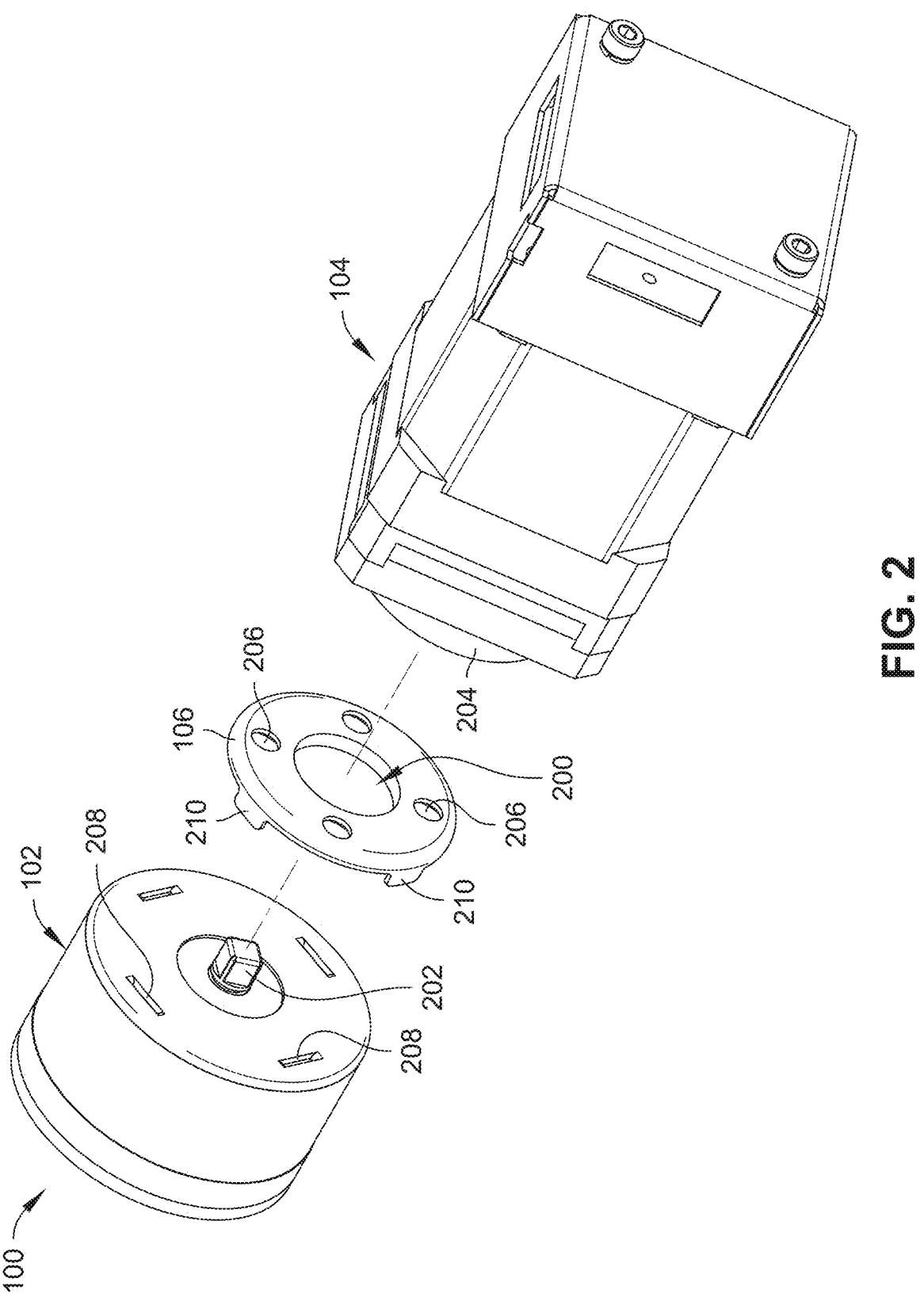
FIG. 2 is a partial exploded view of the valve assembly of FIG. 1 showing a rear side of the valve body having slotted apertures to receive stability protrusions from an actuator mount on the valve actuator in accordance with embodiments of the present disclosure.
Figure 3:
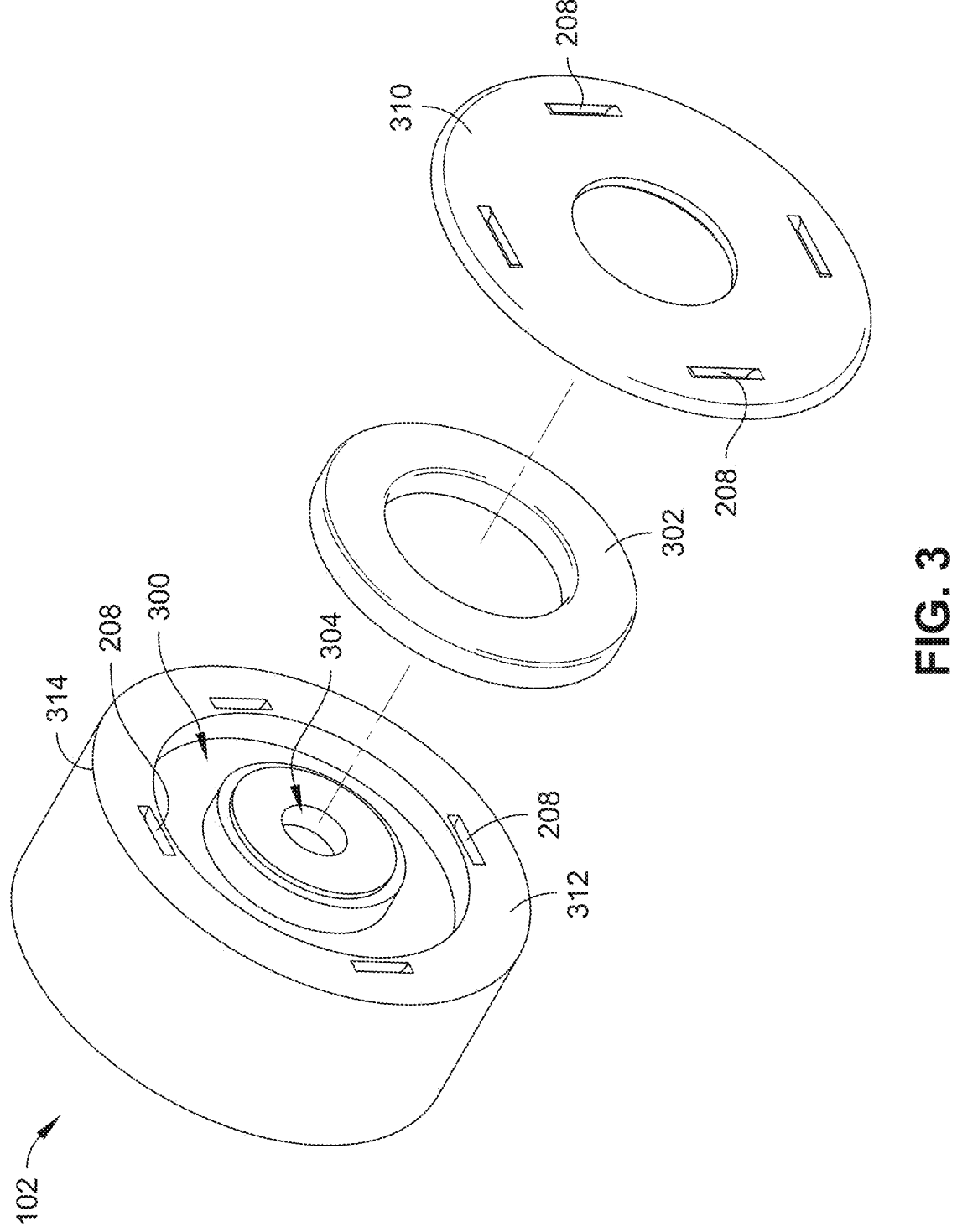
FIG. 3 is a partial exploded view of a valve body having an annular region to house a magnet and having a valve body cover to seal the magnet within the valve body for magnetically coupling the valve body to a valve actuator in accordance with embodiments of the present disclosure.
Figure 5:
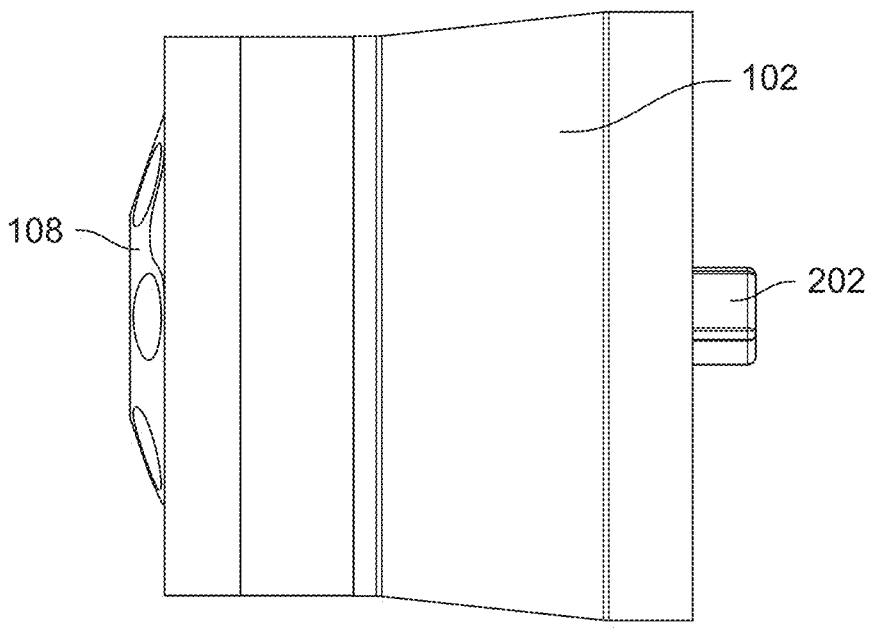
FIG. 5 is a side view of a valve body having a tapered body structure in accordance with embodiments of the present disclosure.

5 selectably couple ports formed by the stator, where rotation of the rotor causes the channels to move between ports dependent on operation of the valve actuator 104. In implementations, the valve body 102 has a generally cylindrical shape (e.g., as shown in FIGS. 1-3), however the valve body 102 is not limited to such shapes and can include, for example, a tapered shape (e.g., as shown in FIG. 5), a rectangular shape, an irregular shape, or another shape.

The valve body 102 detachably couples to the valve actuator 104 via magnetic interactions between the valve body 102 and the actuator mount 106 that is secured to the valve actuator 104. For example, a user of the valve 100 can grasp the valve body 102 and pull away from the valve actuator 104 to overcome the force of the magnetic coupling to remove the valve body 102 and subsequently reintroduce the same or different valve body 102 to the valve actuator 104 by placing the valve body 102 in proximity to the actuator mount 106.

In implementations, the actuator mount 106 defines an aperture 200 through which a drive shaft 202 rotatably coupled to the valve body 102 (e.g., via one or more internal bearings) passes to couple with a motor or drive of the valve actuator 104. The actuator mount 106 is fixedly coupled to an end 204 of the valve actuator 104 to receive the drive shaft of the valve body 102 through the aperture 200. For example, the actuator mount 106 is shown with a plurality of fastener apertures 206 to receive fasteners for securing the actuator mount 106 to end 204 of the valve actuator 104. In implementations, the actuator mount 106 is constructed from a magnetically attractive material such that the actuator mount 106 is attracted by a magnet or includes a magnetic material attracted to one or more magnets of the valve body 102.

The valve body 102 can support one or more magnets in an interior of the valve body 102, on an exterior of the valve body 102, or combinations thereof, to provide magnetic coupling with the actuator mount 106. For example, referring to FIGS. 3 and 4, the valve body 102 is shown having an annular region 300 to house a ring-shaped magnet 302 within an interior of the valve body 102. The ring-shaped magnet 302 surrounds a shaft aperture 304 formed by the valve body 102 through which the drive shaft 202 can pass to couple between a valve rotor 306 and the valve actuator 104. For example, the magnet 302 (or a plurality of magnets 302) can be positioned radially outward from an axis of rotation 308 of the drive shaft 202. The valve body 102 is also shown with a valve body cover 310 configured to couple to an end 312 of the valve body 102 that is configured to face the actuator mount 106 to couple the magnet 302 within the valve body 102.

In implementations, the valve body cover 310 is ultrasonically welded in place on the valve body 102 to seal the magnet 302 within the annular region 300 of the valve body 102. Interior positioning of the magnet 302 can separate the magnet 302 from an external environment of the valve 100, which can prevent exposure of metallic components of the magnet 302 to nearby sample containers (e.g., sample vials awaiting testing), which can prevent interaction between fragments of the magnet 302 and the samples held in the sample containers to avoid potential contamination risks (e.g., when the valve 100 is used in corrosive sample environments). While the magnet 302 is shown having a ring-shaped configuration, the valve 100 is not limited to such magnet configurations and can include other magnet configurations including, but not limited to, one or more rectangular magnets, one or more square magnets, one or more irregularly shaped magnets, a pattern of individual magnets, a singular magnet, or the like, or combinations thereof.

In implementations, the valve body 102 and the actuator mount 106 include one or more mating features to prevent rotation of the valve body 102 relative to the valve actuator 104. For example, referring to FIGS. 2 and 3, the valve body 102 is shown with slotted apertures 208 positioned to receive stability protrusions 210 extending from the actuator mount 106. The stability protrusions are introduced into the slotted apertures 208 during magnetic coupling of the valve body 102 to the actuator mount 106 and provide resistance to rotational movement of the valve body 102 relative to the valve actuator 104 due to interaction between the stability protrusions 210 and the valve body 102 when inserted into the slotted apertures 208. The slotted apertures 208 can be provided through each of the valve body cover 310 and the end 312 of the valve body 102 (e.g., as shown in FIG. 3), can be provided through just the valve body cover 310, or can have a combination of one or more apertures through each of the valve body cover 310 and the end 312 of the valve body 102 and one or more apertures through just the valve body cover 310.

While the valve 100 is shown with a plurality of slotted apertures 208 and a plurality of corresponding stability protrusions 210, the valve 100 is not limited to a particular number or arrangement of mating features. For example, the valve 100 can include a single aperture 208 and a single corresponding stability protrusion 210, the valve 100 can include fewer than four apertures 208 and corresponding stability protrusions 210, the valve 100 can include greater than four apertures 208 and corresponding stability protrusions 210, or the like. Additionally, the valve 100 is not limited to the slotted shapes of the apertures 208 and the protrusions 210 and can include any shape of aperture 208 and corresponding shape of protrusion 210. In implementations, the positioning of the aperture(s) 208 and the protrusion(s) 210 provide a keyed arrangement of the valve body 102 relative to the valve actuator 104, such that the valve body 102 is oriented in a particular direction relative to the valve actuator 104, which can ensure proper orientation of the valve 100 for fluid flow configurations and changing valve orientations via rotation of the rotor 306 by the valve actuator 104. Alternatively or additionally, the magnets 302 and the actuator mount 106 can provide a keyed arrangement of the valve body 102 relative to the valve actuator 104, such as by providing selective areas of the actuator mount 106 with a magnetically attractive materials, and with the remaining areas of the actuator mount 106 being not magnetically attractive, by providing magnets with opposing poles on each of the valve body 102 and the actuator mount 106 to magnetically couple in a particular orientation, or the like.

Figure 4:
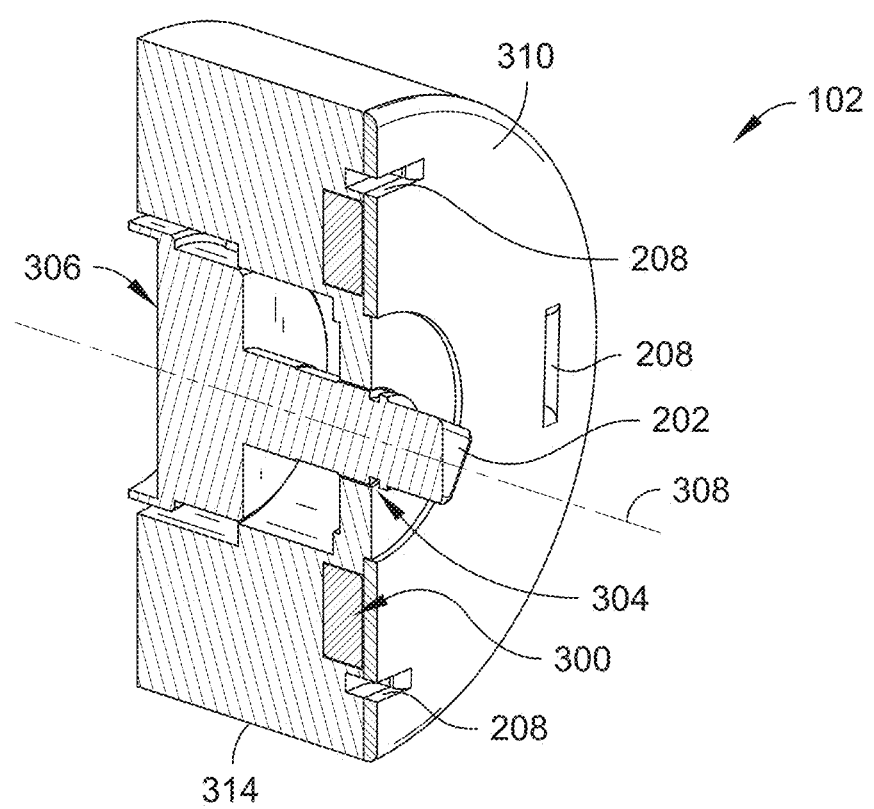
FIG. 4 is a cross-sectional view of the valve body of FIG. 3 having the magnet within the valve body to couple to an actuator mount and having a drive shaft within the valve body to turn a valve rotor under control by a valve actuator in accordance with embodiments of the present disclosure.
Figure 6A:
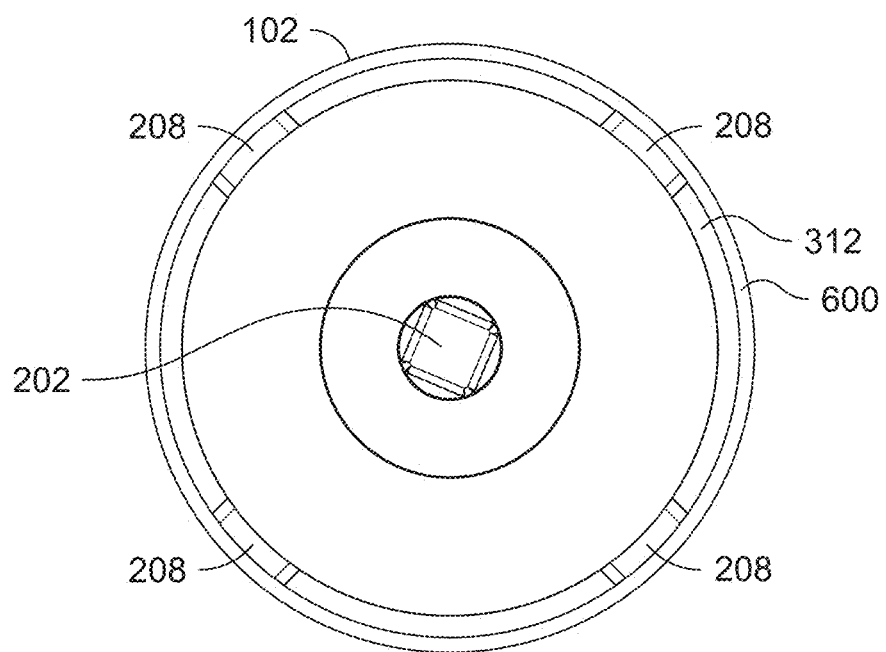
FIG. 6A is a top plan view of the rear of a valve body having slotted apertures positioned adjacent a valve body skirt to receive stability protrusions from an actuator mount in accordance with embodiments of the present disclosure.
Figure 6B:
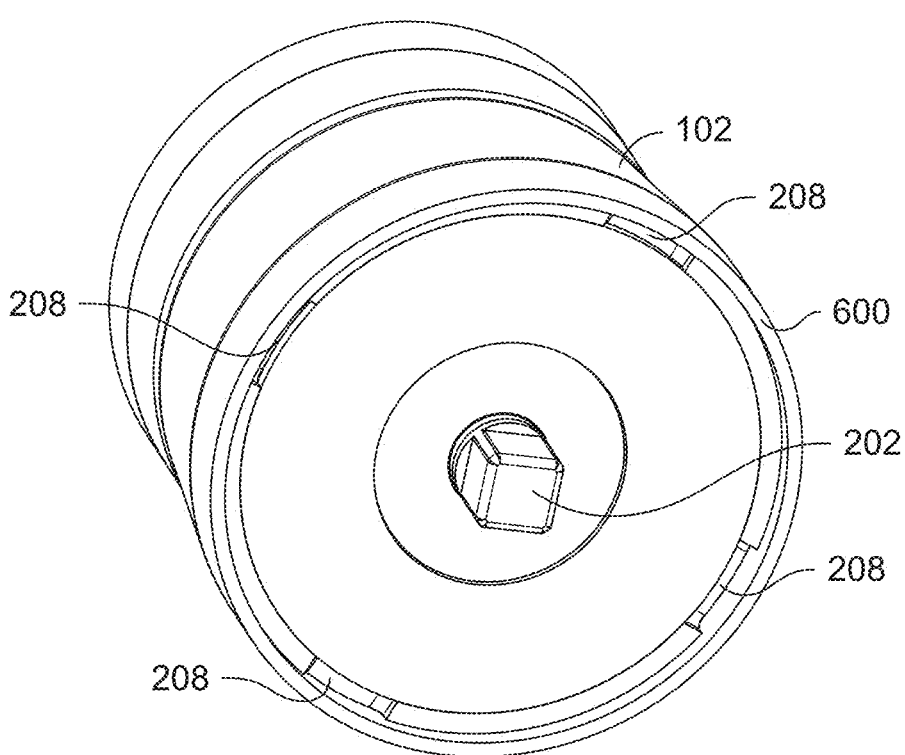
FIG. 6B is an isometric view of the valve body of FIG. 6A.
Figure 7A:
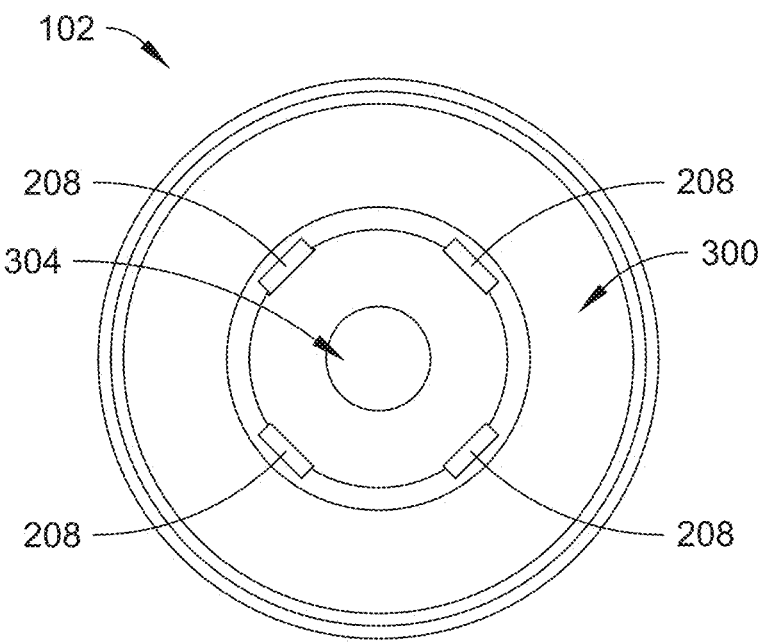
FIG. 7A is a top plan view of the rear of a valve body having slotted apertures positioned radially inward from a cavity configured to hold one or more magnets, the slotted apertures positioned to receive stability protrusions from an actuator mount in accordance with embodiments of the present disclosure.
Figure 7B:
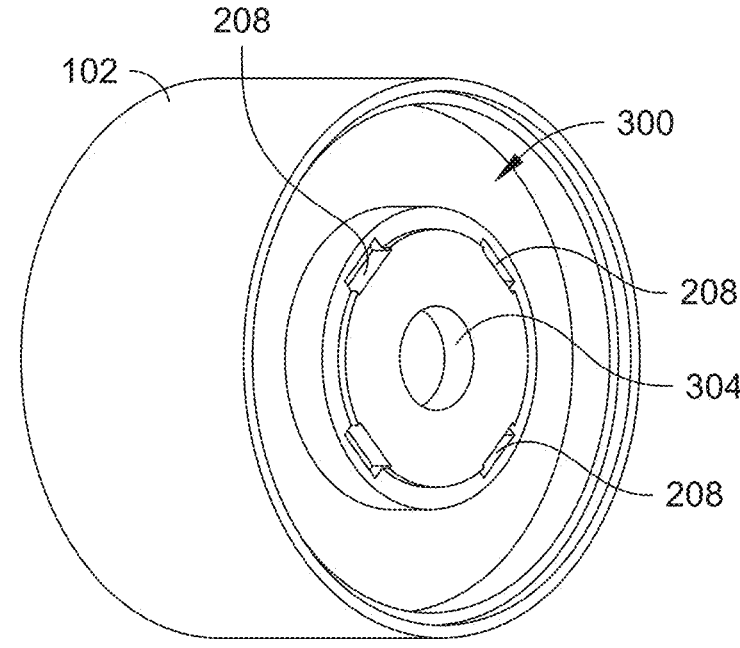
FIG. 7B is an isometric view of the valve body of FIG. 7A.
Figure 7C:
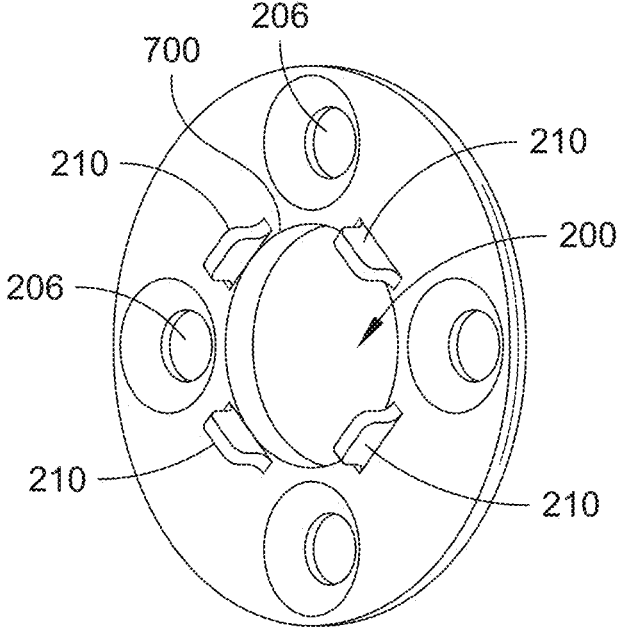
FIG. 7C is an isometric view of an actuator mount having stability protrusions to interface with the slotted apertures of the valve body of FIG. 7A.
Figure 8A:
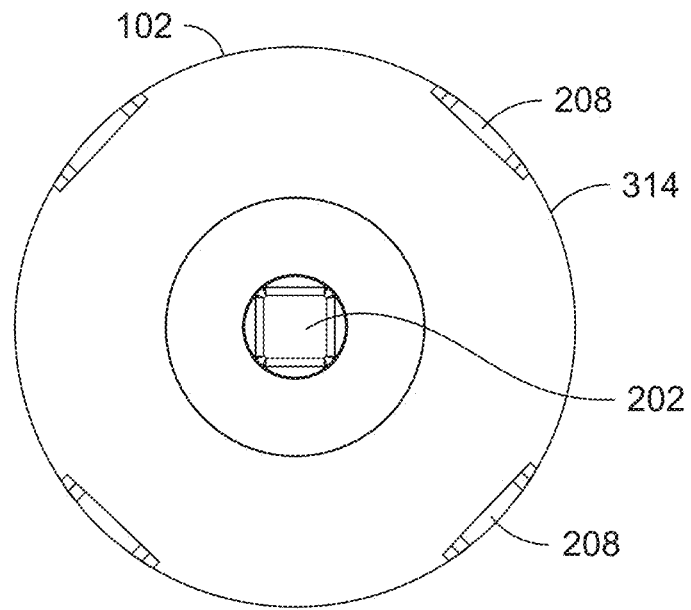
FIG. 8A is a top plan view of the rear of a valve body having slotted apertures positioned on an outer edge of the valve body, the slotted apertures positioned to receive stability protrusions from an actuator mount in accordance with embodiments of the present disclosure.
Figure 8B:
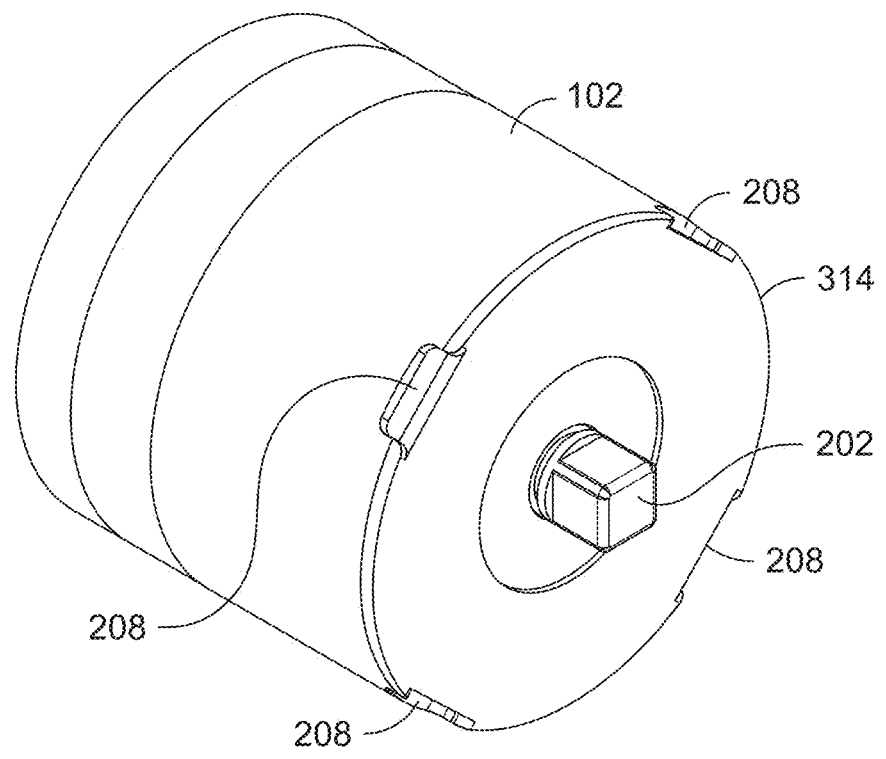
FIG. 8B is an isometric view of the valve body of FIG. 8A.
Figure 8C:
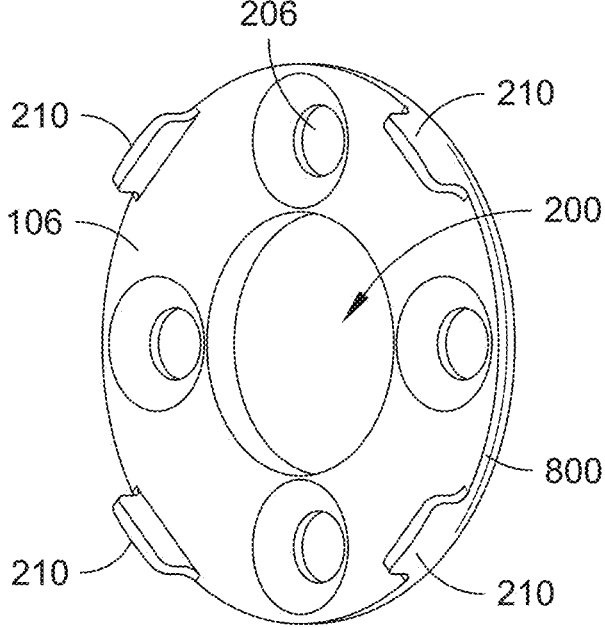
FIG. 8C is an isometric view of an actuator mount having stability protrusions to interface with the slotted apertures of the valve body of FIG. 8A.

The positioning of the apertures 208 on the valve body 102 and the protrusions 210 on the actuator mount 106 can be varied to provide multiple coupling arrangements and to accommodate different sizes of the valve body 102 and the actuator mount 106 (e.g., such as when the actuator mount 106 can interface with multiple different types or sizes of valve body 102). For example, the apertures 208 can be positioned radially outward from the annular region 300 and radially inward from an exterior edge 314 of the valve body 102, as shown in FIGS. 3 and 4, with the actuator mount 106 having corresponding positions for the protrusions 210. Alternatively or additionally, the apertures 208 can be positioned radially inward from the annular region 300 of the valve body 102, as shown in FIGS. 7A and 7B, with the actuator mount 106 having corresponding positions for the protrusions 210 (e.g., adjacent an interior edge 700 that forms the aperture 200, as shown in FIG. 7C). Alternatively or additionally, the apertures 208 can be positioned radially outward from the annular region 300 at the exterior edge 314 of the valve body 102, as shown in FIGS. 8A and 8B, with the actuator mount 106 having corresponding positions for the protrusions 210 (e.g., on an exterior edge 800 of the actuator mount 106, as shown in FIG. 8C). In implementations, the valve body 102 includes a skirt 600 extending from the end 312 in a direction towards the actuator mount 106 with the apertures 208 positioned radially inward from the skirt 600 (e.g., as shown in FIGS. 6A and 6B).

In implementations, the valve 100 can include one or more fluid sensors to magnetically couple the valve with the fluid sensors to the valve actuator 104. For example, referring to FIGS. 9A and 9B, the valve 100 is shown with a sensor housing 900 configured to house one or more sensors 902 within the sensor housing 900. The valve 100 can include a housing cover 904 to seal the sensors 902 within the sensor housing 900. In implementations, the housing cover 904 is positioned adjacent the actuator mount 106 when the valve body 102 is magnetically coupled with the valve actuator 104 via the actuator mount 106.

It should be noted that while the terms "stator" and "rotor" are used herein to describe the portions of the valve 100 defining fluid flow pathways, these terms are provided by way of example only (e.g., to illustrate how these components interface (e.g., rotate) with respect to one another), and are not meant to limit how the valve members can be actuated with respect to an external reference (e.g., valve mounting hardware, or the like). Thus, in one particular example, a component described as a "stator" may remain substantially stationary (e.g., with respect to an external reference, such as valve mounting hardware), and a component described as a "rotor" may rotate with respect to the stator. However, in another particular example, a component described as a "stator" may rotate with respect to a rotor, and a component described as a "rotor" may remain substantially stationary (e.g., with respect to valve mounting hardware). Further, in some implementations, both a component described as a "stator" and a component described as a "rotor" may rotate with respect to an external reference.

Further, while the valve 100 is described with the valve body 102 having one or more apertures 208 and the actuator mount 106 having one or more corresponding protrusions 210, it is noted that the apertures 208 can be positioned on either or both of the valve body 102 and the actuator mount 106, with the corresponding protrusions 210 positioned on the other of the valve body 102 and the actuator mount. For example, in some implementations, one or more apertures 208 can be formed by the actuator mount 106 with one or more protrusions 210 extending from the valve body 102.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A valve assembly comprising:
a valve body, the valve body including
at least one magnet housed within the valve body, a rotor and a stator configured to define a plurality of fluid flow passageways,
a drive shaft physically coupled with the rotor;
a valve actuator configured to drive the rotor via the drive shaft; and
an actuator mount coupled to the valve actuator and configured to magnetically couple with the at least one magnet of the valve body to magnetically and detachably couple the valve body and the valve actuator, the actuator mount defining an aperture through which the drive shaft passes to couple with the valve actuator, wherein the valve body and the actuator mount each include one or more corresponding mating features to prevent rotation of the valve body relative to the valve actuator when the valve body is magnetically and detachably coupled with the actuator mount, wherein the corresponding mating features include a mating aperture and a protrusion configured to insert at least partially into the mating aperture of the corresponding mating features, and wherein an end of the valve body and the actuator mount having opposing faces that are each substantially perpendicular to an axis of rotation of the drive shaft when the valve body is magnetically and detachably coupled with the actuator mount.

2. The valve assembly of claim 1, wherein the valve body includes a tapered exterior surface.

3. The valve assembly of claim 1, wherein the valve body defines an annular region to house the at least one magnet within the valve body.

4. The valve assembly of claim 3, wherein the drive shaft is coupled to the rotor and configured to pass through the annular region in the valve body to couple with the valve actuator.

5. The valve assembly of claim 3, wherein at least one of the protrusion or the mating aperture is positioned radially inward from the annular region in the valve body with respect to the axis of rotation of the drive shaft.

6. The valve assembly of claim 3, wherein at least one of the protrusion or the mating aperture is positioned radially outward from the annular region in the valve body with respect to the axis of rotation of the drive shaft.

7. The valve assembly of claim 3, wherein at least one of the protrusion or the mating aperture is positioned between the annular region and an exterior edge of the valve body.

8. A valve assembly, comprising:
a valve body configured to detachably couple to an end of a valve actuator via magnetic interaction,
the valve body including
a rotor and a stator configured to define a plurality of fluid flow passageways through the valve assembly,
a drive shaft physically coupled with the rotor and extending through a shaft aperture formed in the valve body, the drive shaft configured to extend through the end of the valve actuator to couple between the rotor and the valve actuator to drive the rotor,
at least one magnet housed within an interior region defined by the valve body, the at least one magnet configured to magnetically and detachably couple with the valve actuator, and
at least one of a protrusion configured to insert into a mating aperture on the valve actuator or the mating aperture configured to receive the protrusion on the valve actuator to prevent rotation of the valve body relative to the valve actuator when magnetically and detachably coupled, wherein the valve body cover and the valve actuator are configured to have opposing faces that are each substantially perpendicular to an axis of rotation of the drive shaft when the valve body is magnetically and detachably coupled with the end of the valve actuator, and wherein the at least one magnet is positioned within the valve body at an interior position offset from the face of the valve body cover.

9. The valve assembly of claim 8, wherein the valve body includes a tapered exterior surface.

10. The valve assembly of claim 8, wherein the at least one magnet is ring-shaped, and wherein the interior region is an annular region within the valve body.

11. The valve assembly of claim 8, wherein the at least one of the protrusion or the mating aperture is positioned radially inward from the interior region in the valve body with respect to the axis of rotation of the drive shaft.

12. The valve assembly of claim 8, wherein the at least one of the protrusion or the mating aperture is positioned radially outward from the interior region in the valve body with respect to the axis of rotation of the drive shaft.

13. The valve assembly of claim 8, wherein the at least one of the protrusion or the mating aperture is positioned between the interior region and an exterior edge of the valve body.

14. A valve assembly comprising:
  a valve body, the valve body including
    at least one magnet housed within the valve body,
    a rotor and a stator configured to define a plurality of fluid flow passageways,
    a drive shaft physically coupled with the rotor;
  a valve actuator configured to drive the rotor via the drive shaft, the valve actuator including an end configured to magnetically couple with the at least one magnet of the valve body to magnetically and detachably couple the valve body and the valve actuator, the end of the valve actuator defining an aperture through which the drive shaft passes, wherein the valve body and the end of the valve actuator each include one or more corresponding mating features to prevent rotation of the valve body relative to the valve actuator when the valve body is magnetically and detachably coupled with the end of the valve actuator, wherein the corresponding mating features include a mating aperture and a protrusion configured to insert at least partially into the mating aperture of the corresponding mating features, and wherein an end of the valve body and the end of the valve actuator having opposing faces that are each substantially perpendicular to an axis of rotation of the drive shaft when the valve body is magnetically and detachably coupled with the end of the valve actuator.

15. The valve assembly of claim 14, wherein the valve body includes a tapered exterior surface.

16. The valve assembly of claim 14, wherein at least one of the protrusion or the mating aperture is positioned radially inward from the interior region in the valve body with respect to the axis of rotation of the drive shaft.

17. The valve assembly of claim 14, wherein at least one of the protrusion or the mating aperture is positioned radially outward from the interior region in the valve body with respect to the axis of rotation of the drive shaft.

18. The valve assembly of claim 14, wherein at least one of the protrusion or the mating aperture is positioned between the interior region and an exterior edge of the valve body.

\* \* \* \* \*